United States Patent [19]

Maki et al.

[11] Patent Number: 5,318,626
[45] Date of Patent: Jun. 7, 1994

[54] PROCESS FOR CONVERTING 2,9-DIMETHYLQUINACRIDONE COMPOUND INTO PIGMENT

[75] Inventors: Hitoshi Maki; Shigeki Kato, both of Tokyo, Japan

[73] Assignee: Toyo Ink Manufacturing Co., Ltd., Tokyo, Japan

[21] Appl. No.: 78,323

[22] PCT Filed: Nov. 6, 1992

[86] PCT No.: PCT/JP92/01462
 § 371 Date: Jun. 22, 1993
 § 102(e) Date: Jun. 22, 1993

[87] PCT Pub. No.: WO93/09186
 PCT Pub. Date: May 13, 1993

[30] Foreign Application Priority Data
 Jul. 11, 1991 [JP] Japan .................. 3-318602

[51] Int. Cl.$^5$ ............................................. C09B 48/00
[52] U.S. Cl. ................................ 106/497; 106/495; 546/49
[58] Field of Search ............ 106/495, 497; 546/49

[56] References Cited

U.S. PATENT DOCUMENTS

| | | | |
|---|---|---|---|
| 3,607,336 | 9/1971 | Jaffe | 106/495 |
| 3,686,009 | 8/1972 | West | 106/495 |
| 4,212,975 | 7/1980 | Kroh et al. | 546/49 |
| 4,400,515 | 8/1983 | Fuchs et al. | 546/47 |

FOREIGN PATENT DOCUMENTS 1051762 12/1966 United Kingdom .

*Primary Examiner*—Helene Klemanski
*Assistant Examiner*—Scott L. Hertzog
*Attorney, Agent, or Firm*—Wenderoth, Lind & Ponack

[57] ABSTRACT

A process for converting a 2,9-dimethylquinacridone compound into a pigment, which comprises pouring a solution of a crude 2,9-dimethylquinacridone compound in sulfuric acid into continuously flowing water to form a fine precipitate, recovering said precipitate by filtration, washing it with water, adding it to a lower alcohol having 1 to 4 carbon atoms and heating the resultant mixture to 60°–200° C.

10 Claims, No Drawings

PROCESS FOR CONVERTING 2,9-DIMETHYLQUINACRIDONE COMPOUND INTO PIGMENT

TECHNICAL FIELD

The present invention relates to a process for converting a 2,9-dimethylquinacridone compound into a pigment. More specifically, it relates to a process for converting a 2,9-dimethylquinacridone compound into a pigment which particularly has the form of crystal grains having a length:width average ratio of 2:1–5:1 and a specific surface area of 50–90 m$^2$/g, which has a crystal spacing and relative intensity of a so-called blue color tone pigment when measured by X-ray diffractometry and which has advantageous surface properties and various practically advantageous properties.

TECHNICAL BACKGROUND

As a process for producing a crude 2,9-dimethylquinacridone compound, for example, Japanese Patent Publication No. 36-13833 discloses a production process in which 2,9-dimethyl-6,13-dihydroquinacridone is oxidized in an alkaline alcoholic solvent in the presence of sodium nitrobenzenesulfonate or sodium polysulfide, or Japanese Patent Publication No. 38-26487 discloses a production process in which 2,5-di(p-toluidino)terephthalic acid is heated in polyphosphoric acid. A 2,9-dimethylquinacridone compound is known to be a substance in a solid form when it is a crude one. However, the following is also known. It is not much useful as a pigment when it is used directly. When its powder is used as a component for a coating composition, there is only obtained a product which is inferior from the commercial point of view. That is, this product is poor in dispersibility, liable to degenerate due to heat and light, unstable in a solvent, and dull in color tone. Attempts have been hitherto made to convert this substance into a useful pigment for obtaining 2,9-dimethylquinacridone having a desirable color tone.

Japanese Patent Publication No. 41-11348 discloses a treatment method in which a crude substance is pretreated, or not pretreated, with a solvent such as dimethylformamide, a lower alcohol, dimethylsulfoxide or xylene, and milled with a ball mill while it is immersed in a solvent such as xylene. It has been already revealed that 2,9-dimethylquinacridone is converted into two different crystal forms by this treatment. One having the first crystal form is obtained when the above pretreatment is not carried out, and it is called a blue color tone pigment. One having the second crystal form is obtained through the above pretreatment, and it is called a yellow color tone pigment. These pigments in these crystal forms are both stable at high temperatures, and particularly, the yellow color tone pigment is stable at high temperatures even in the presence of a solvent. However, these pigments obtained by the above pigment-forming method are both non-uniform in particle size, and when used in a coating composition, they have no satisfactory dispersibility.

Japanese Patent Publication No. 41-11348 proposes a third crystal form. One having this crystal form is obtained by adding a glycol, finely milled common salt and flakes-shaped common salt to a crude substance of 2,9-dimethylquinacridone or the yellow color tone pigment described in Japanese Patent Publication No. 41-11348 and milling with a milling apparatus to cause extreme shear deformation. However, it is required to fully mix common salt in an amount 2.25–15 times the weight of the pigment and a glycol in an amount 0.75 to 3 times the weight of the pigment with the pigment, and in this case, a considerable amount of energy is required. Further, after the milling, it is required to separate the added common salt and glycol by washing. Thus, the above pigment is not suitable for commercial production.

For producing 2,9-dimethylquinacridone, in Japanese Patent Publication No. 44-22419, Japanese Patent Publication No. 52-43497 and Japanese Laid-open Patent Publication No. 55-48250, 2,9-dimethylquinacridone is synthesized from 2,5-di(p-toluidino)terephthalic acid as a raw material in the presence of polyphosphoric acid or polyphosphoric acid ester as a solvent or a cyclization agent, and then separated while preventing the solidification of polyphosphoric acid by adding a lower alcohol, whereby 2,9-dimethylquinacridone is recovered as aggregates of fine particles. This product is treated by stirring and heating it in a lower alcohol such as isobutanol to produce a blue color tone pigment. However, it is very difficult to recover or treat the used polyphosphoric acid, and the above method is not suitable for industrial production.

Japanese Laid-open Patent Publication No. 55-116758 discloses a method for obtaining a pigment in which 2,9-dimethylquinacridone is dried and milled beforehand together with a milling aid such as alum, the milled product is slurried in sulfuric acid to dissolve the milling aid, the slurry is filtered and the resultant pigment is washed with water and dried. However, the pigment obtained by this method has a defect that it is nonuniform in particle size and that it has therefore poor fluidity when used in a coating composition.

In general, when 2,9-dimethylquinacridone is used as a coloring material in a coating composition or a colorant, its properties extremely vary depending upon its crystal form and particle size. It therefore constitutes an important technique to control the crystal state and particle size thereof. In the most optimum crystal form of 2,9-dimethylquinacridone as a pigment for a coloring material, 2,9-dimethylquinacridone is required to have the form of crystal grains having a length:width average ratio of 2:1–5:1 and a specific surface area of 50–90 m$^2$/g and is required to have a crystal spacing and relative intensity of a so-called blue color tone pigment when measured by X-ray diffractometry. The blue color tone pigment and yellow color tone pigment are disclosed in Japanese Patent Publication No. 41-11348, and the crystal spacings and relative intensities thereof by X-ray diffraction are as shown in Table 1.

TABLE 1

| Yellow color tone pigment | | Blue color tone pigment | |
|---|---|---|---|
| Interplane distance (A) | Intensity (%) | Interplane distance (A) | Intensity (%) |
| 16.0 | 100.0 | 17.2 | 100.0 |
| 3.35 | 67 | 3.34 | 73 |
| 6.43 | 55 | 6.39 | 53 |
| 3.51 | 21 | 8.3 | 30 |
| 8.0 | 24 | | |
| 3.74 | 17 | | |
| 3.97 | 14 | | |

For obtaining specific crystal forms as coloring materials, a variety of crystal transformation treatments are carried out. Since, however, there are many crystal forms concerning 2,9-dimethylquinacridone, it is liable to have a mixture of different crystal forms depending upon slight differences in production conditions. For achieving purity of the crystal state, therefore, 2,9-dimethylquinacridone is once brought into a molten state to collapse its crystal states and then crystallized under specific treatment conditions. In this method, a product having a high crystal purity can be obtained, and a pigment having excellent properties and color tone as a coloring material can be obtained. As a typical method for bringing the crystal into a molten state, an acid paste treatment method is available. In this method, 2,9-dimethylquinacridone is once dissolved in concentrated sulfuric acid and the resultant solution is poured into water to precipitate it. This method is excellent, since it is simple and easy in operation and the production cost required by it is low. However, since a sulfuric acid solution has a high viscosity on the other hand, the diffusion of the solution into water is slow when poured into water, and 2,9-dimethylquinacridone having high crystallizability sometimes causes the growth of an undesirable crystal form at this time. As a result, the undesirable crystal form and undesirable crystal grains sometimes remain at a step of growing a specific crystal thereafter, thereby to deteriorate the crystal purity.

It is an object of the present invention to provide a process for producing a 2,9-dimethylquinacridone pigment which contains no crystal form or crystal grains undesirable as a coloring material and has a high crystal purity.

DISCLOSURE OF THE INVENTION

The present invention is directed to a process for converting a 2,9-dimethylquinacridone compound into a pigment, which comprises pouring a solution of a crude 2,9-dimethylquinacridone compound in sulfuric acid into continuously flowing water to form a fine precipitate, recovering said precipitate by filtration, washing it with water and then heat-treating it in a lower alcohol having 1 to 4 carbon atoms at 60°–200° C.

In the present invention, when a solution of a 2,9-dimethylquinacridone compound in concentrated sulfuric acid is poured into water, it is poured into continuously flowing water, whereby constant conditions can be maintained from the first step of the operation to the last. Therefore, not only the crystal growth is prevented, but also a product having a constant quality can be obtained. Further, in the process of the present invention, the 2,9-dimethylquinacridone compound obtained by the above method is heat-treated in a low alcohol having 1 to 4 carbon atoms at 60°–200° C., whereby there is obtained a 2,9-dimethylquinacridone pigment having the form of crystal grains whose length:width average ratio is 2:1–5:1 and whose specific surface area is 50–90 m$^2$/g. When measured by X-ray diffractometry, the so-obtained 2,9-dimethylquinacridone pigment exhibits spacings and relative intensity identical to those of the blue color tone pigment disclosed in Japanese Patent Publication No. 41-11348.

The continuously flowing water used in the present invention refers to water flowing in a pipe or tube and having a water pressure of 0.5–4.5 kg/cm$^2$.G. For pouring a solution of a 2,9-dimethylquinacridone compound in concentrated sulfuric acid into the above continuously flowing water, preferably, the pouring is quantitatively carried out by means of a water-jet aspirator, or the solution of a 2,9-dimethylquinacridone compound in concentrated sulfuric acid was pressure-increased to 0.5–4.5 kg/cm$^2$.G and jetted into the continuously flowing water through a capillary tube.

The solution of a 2,9-dimethylquinacridone compound in concentrated sulfuric acid is brought into contact with the continuously flowing water to precipitate the 2,9-dimethylquinacridone compound. The concentrated sulfuric acid preferably has a concentration of at least 90%. The aqueous solution containing this precipitate is filtered to separate it into water and the precipitate, and preferably, the precipitate is washed with water or a low-concentration alkaline aqueous solution such as an aqueous solution of caustic soda or caustic potassium to form a paste having a solid content of 10–20% by weight.

The solvent used in a granuation step in the present invention refers to a lower alcohol having 1 to 4 carbon atoms, and specifically, it includes methanol, ethanol, n-propanol, iso-propanol, n-butanol, iso-butanol and tert-butanol. The solvent is added to the aqueous paste containing 10–20% by weight of the 2,9-dimethylquinacridone compound as a solid content in such an amount that the weight of the solvent is 5–20 times the weight of the solid content (2,9-dimethylquinacridone compound), and while the mixture is fully stirred, the mixture is maintained at 60°–200° C. for 0.5–4.0 hours, preferably for 0.5–1 hour.

When the 2,9-dimethylquinacridone compound is dissolved in concentrated sulfuric acid, and/or when the aqueous paste of the finely precipitated 2,9-dimethylquinacridone compound is treated with a lower alcohol having 1 to 4 carbon atoms, a quinacridone pigment derivative may be added in an amount of 1–20% by weight based on the solid content (quinacridone compound). The addition of the quinacridone pigment derivative is preferred since a 2,9-dimethylquinacridone pigment to be formed is controlled into a preferred crystal state, and it can be imparted with surface properties advantageous as a coloring material and various properties advantageous in practical use. Examples of the quinacridone pigment derivative include basic quinacridone pigment derivatives disclosed in Japanese Laid-open Patent Publication No. 2-123168, acidic quinacridone derivatives disclosed in Japanese Patent Publication No. 45-29755 or Japanese Laid-open Patent Publication No. 58-101161 and neutral quinacridone pigment derivatives disclosed in Japanese Patent Publication No. 44-13378, Japanese Laid-open Patent Publication No. 59-96175 and Japanese Laid-open Patent Publication No. 63-264674. The present specification includes the above Publications as descriptions of the quinacridone pigment derivative.

When the aqueous paste of the finely precipitated 2,9-dimethylquinacridone compound is treated with the lower alcohol having 1 to 4 carbon atoms, and when this solvent is not completely miscible with water, a commercially available surfactant may be added in an amount of 0.2–20% by weight based on the 2,9-dimethylquinacridone compound. The commercially available surfactant includes nonionic surfactants such as polyoxyethylene alkyl ether, sorbitan fatty acid ester, polyoxyethylene fatty acid ester and glycerin fatty acid ester and anionic surfactants such as fatty acid salt, alkyl sulfuric acid ester salt, alkylbenzenesulfonate and alkylsulfosuccinate.

According to the process of the present invention, there can be obtained a 2,9-dimethylquinacridone pigment having the form of crystal grains having a length:width average ratio of 2:1–5:1 and a specific surface area of 50–90 m²/g. When measured by X-ray diffractometry, the obtained 2,9-dimethylquinacridone pigment has crystal spacings and relative intensity identical to those of a product which is conventionally called a blue color tone pigment.

The present invention will be explained further in detail hereinafter by reference to Examples, in which "part" stands for "parts by weight" and "%" stands for "% by weight".

REFERENTIAL EXAMPLE

Preparation of crude 2,9-dimethylquinacridone

1 Mole of 1,4-cyclohexanedione-2,5-di(methyl carboxylate), methanol whose weight was 10 times the weight of the 1,4-cyclohexanedione-2,5-di(methyl carboxylate), 2.53 mol of p-toluidine and 0.1 mol of hydrochloric acid were allowed to react at 65°–100° C. for 3 hours while they were substantially not in contact with oxygen, and the formed product was recovered by filtration and washed. This product was further heated to 250°–268° C. in a dimethylnaphthalene isomer mixture while it was substantially not in contact with oxygen, and the resultant product was recovered by filtration and washed. Added thereto were ethylene glycol monoethyl ether whose amount was 7 times the weight thereof and 50% caustic soda in such an amount that was 18% based on the total amount of the mixture. Then, sodium m-nitrobenzenesulfonate was added for oxidation, and the formed product was recovered by filtration and washed to give a crude 2,9-dimethylquinacridone having a purity of at least 99%. The crude 2,9-dimethylquinacridone obtained in this Referential Example was used in the following Examples.

EXAMPLE 1

30.00 Parts (0.088 mol) of the fully dried crude 2,9-dimethylquinacridone and 300.0 parts of 98% sulfuric acid were weighed out and placed in a glass beaker having a volume of 1 liter, and fully stirred for 1 hour to form a solution. The total amount of this solution of the crude 2,9-dimethylquinacridone in sulfuric acid was added dropwise to a water current whose gage pressure was set at 3.50 kg/cm².G through an aspirator connected to the water current. One minute was taken for this addition. The resultant precipitate was recovered by filtration and washed with water up to pH 6.8 to give an aqueous paste having a solid content of 10.50%. The resultant aqueous paste containing 10.50% of 2,9-dimethylquinacridone as a solid content and 300.0 parts of iso-butanol were placed in a 1-liter flask equipped with a cooling tube, and the mixture was stirred at room temperature for 30 minutes, and then maintained at 90° C. for 1 hour. The resultant product was recovered by filtration and dried to give a 2,9-dimethylquinacridone pigment having the form of crystal grains whose length:width average ratio was 5:1 and whose specific surface area was 55.4 m²/g.

COMPARATIVE EXAMPLE 1

30.00 Parts (0.088 mol) of the fully dried crude 2,9-dimethylquinacridone and 300.0 parts of 98% sulfuric acid were weighed out and placed in a glass beaker having a volume of 1 liter, and fully stirred for 1 hour to form a solution. All of this solution of the crude 2,9-dimethylquinacridone in sulfuric acid was at once added to 5 liters of water in a glass beaker having a volume of 10 liters, and the resultant precipitate was recovered by filtration and washed with water up to pH 6.8 to give an aqueous paste having a solid content of 10.50%. The resultant aqueous paste containing 10.50% of 2,9-dimethylquinacridone as a solid content and 300.0 parts of iso-butanol were placed in a 1-liter flask equipped with a cooling tube, and the mixture was stirred at room temperature for 30 minutes, and then maintained at 90° C. for 1 hour. The resultant product was recovered by filtration and dried to give a 2,9-dimethylquinacridone pigment having the form of crystal grains whose length:width average ratio was 20:1 and whose specific surface area was 30.4 m²/g.

EXAMPLE 2

A 2,9-dimethylquinacridone pigment was obtained in the same manner as in Example 1 except that the iso-butanol was replaced with n-propanol. The 2,9-dimethylquinacridone pigment had the form of crystal grains whose length:width average ratio was 2:1 and whose specific surface area was 75.1 m²/g.

EXAMPLE 3

A 2,9-dimethylquinacridone pigment was obtained in the same manner as in Example 1 except that the temperature for the treatment with isobutanol was changed to 130° C. The 2,9-dimethylquinacridone pigment had the form of crystal grains whose length:width average ratio was 5:1 and whose specific surface area was 50.2 m²/g.

EXAMPLE 4

A 2,9-dimethylquinacridone pigment was obtained in the same manner as in Example 3 except that 0.9 g of a basic quinacridone pigment derivative substituted with an N,N-dimethylaminopropylaminosulfonyl group was further added to the solution in sulfuric acid. The 2,9-dimethylquinacridone pigment had the form of crystal grains whose length:width average ratio was 2:1 and whose specific surface area was 79.8 m²/g.

EXAMPLE 5

A 2,9-dimethylquinacridone was obtained in the same manner as in Example 3 except that 0.9 g of a basic quinacridone pigment derivative was further added when the treatment with iso-butanol was carried out. The 2,9-dimethylquinacridone pigment had the form of crystal grains whose length:width average ratio was 2:1 and whose specific surface area was 77.4 m²/g.

EXAMPLE 6

A 2,9-dimethylquinacridone was obtained in the same manner as in Example 4 except that 0.9 g of alkylsulfosuccinic acid salt as an anionic surfactant was further added when the treatment with iso-butanol was carried out. The 2,9-dimethylquinacridone pigment had the form of crystal grains whose length:width average ratio was 4:1 and whose specific surface area was 68.5 m²/g.

UTILIZABILITY IN INDUSTRY

According to the present invention, a 2,9-dimethylquinacridone pigment having an advantageous crystal form as a coloring material can be stably produced. The 2,9-dimethylquinacridone obtained by the process of the present invention gives very high transparency to all of coating compositions obtained by adding pigment to known lacquer system, and this is very important in practical use. Further, it shows very high color intensity and rheology properties. Further, according to the process of the present invention, the 2,9-dimethylquinacridone pigment can be produced continuously, and improvement in productivity and a decrease in a production cost can be achieved.

We claim:

1. A process for converting a 2,9-dimethylquinacridone compound into a pigment, which comprises pouring a solution of a crude 2,9-dimethylquinacridone compound in sulfuric acid into continuously flowing water to form a fine precipitate, recovering said precipitate by filtration, washing it with water, adding it to a lower alcohol having 1 to 4 carbon atoms and heating the resultant mixture to 60°-200° C.

2. A process for converting a 2,9-dimethylquinacridone compound into a pigment according to claim 1, wherein the sulfuric acid is an aqueous solution having a concentration of at least 90%.

3. A process for converting a 2,9-dimethylquinacridone compound into a pigment according to claim 1, wherein the continuously flowing water is flowing water having a water pressure of 0.5-4.5 $kg/cm^2.G$.

4. A process for converting a 2,9-dimethylquinacridone compound into a pigment according to claim 1, wherein the solution of a crude 2,9-dimethylquinacridone compound in sulfuric acid further contains a quinacridone pigment derivative.

5. A process for converting a 2,9-dimethylquinacridone compound into a pigment according to claim 4, wherein the quinacridone pigment derivative is a basic, acidic or neutral quinacridone pigment derivative.

6. A process for converting a 2,9-dimethylquinacridone compound into a pigment according to claim 4, wherein the quinacridone pigment derivative is contained in an amount of 1-20% by weight based on the crude 2,9-dimethylquinacridone compound.

7. A process for converting a 2,9-dimethylquinacridone compound into a pigment according to claim 1, wherein a solution containing the lower alcohol and the precipitate further contains a quinacridone pigment derivative.

8. A process for converting a 2,9-dimethylquinacridone compound into a pigment according to claim 7, wherein the quinacridone pigment derivative is contained in an amount of 1-20% by weight based on the crude 2,9-dimethylquinacridone compound.

9. A process for converting a 2,9-dimethylquinacridone compound into a pigment according to claim 1, wherein a solution containing the lower alcohol and the precipitate further contains 0.2-20% by weight of a surfactant based on the 2,9-dimethylquinacridone compound.

10. A 2,9-dimethylquinacridone pigment formed of crystal grains having a length:width average ratio of 2:1-5:1 and a specific surface area of 50-90 m/g and having the same crystal spacing and relative intensity as those of a color tone pigment when measured by X-ray diffractometry, and obtained by the process recited in claim 1.

* * * * *